Figure 1:
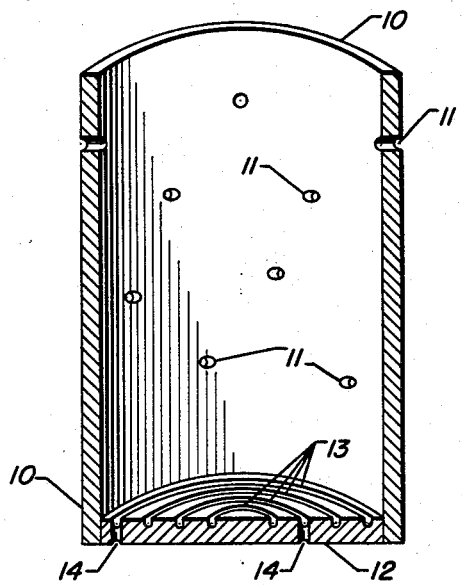

July 6, 1965

C. G. GERHOLD ETAL 3,192,954

DISTRIBUTING VALVE

Filed Oct. 18, 1963

5 Sheets-Sheet 1

INVENTORS:
Clarence G. Gerhold
Donald B. Broughton
BY:
ATTORNEYS

July 6, 1965 C. G. GERHOLD ETAL 3,192,954
DISTRIBUTING VALVE
Filed Oct. 18, 1963 5 Sheets-Sheet 2

INVENTORS:
Clarence G. Gerhold
Donald B. Broughton
BY:
ATTORNEYS

July 6, 1965

C. G. GERHOLD ETAL 3,192,954

DISTRIBUTING VALVE

Filed Oct. 18, 1963

5 Sheets-Sheet 3

INVENTORS:
Clarence G. Gerhold
Donald B. Broughton
BY:
James R. Hoatson Jr.
William H. Page II
ATTORNEYS July 6, 1965

C. G. GERHOLD ETAL 3,192,954

DISTRIBUTING VALVE

Filed Oct. 18, 1963

5 Sheets-Sheet 4

INVENTORS:
Clarence G. Gerhold
Donald B. Broughton

BY:

ATTORNEYS

July 6, 1965　　C. G. GERHOLD ETAL　　3,192,954
DISTRIBUTING VALVE

Filed Oct. 18, 1963　　5 Sheets-Sheet 5

INVENTORS:
Clarence G. Gerhold
Donald B. Broughton
BY:
ATTORNEYS

United States Patent Office 3,192,954
Patented July 6, 1965

1

3,192,954
DISTRIBUTING VALVE
Clarence G. Gerhold, Palatine, and Donald B. Broughton, Chicago, Ill., assignors to Universal Oil Products Company, Des Plaines, Ill., a corporation of Delaware
Filed Oct. 18, 1963, Ser. No. 317,261
9 Claims. (Cl. 137—625.11)

This invention relates to a rotary distributing valve for effecting the transfer of a fluid stream from one conduit to any of a plurality of other conduits, and, more particularly, it relates to a rotary multiport valve by which a multiplicity of fluid streams may be simultaneously and individually connected to a plurality of process conduits according to a periodic sequence determined by the valve construction. The present application is a continuation-in-part of our copending application Serial No. 56,558, filed September 16, 1960, which in turn is a continuation-in-part of our application Serial No. 71,746, filed March 17, 1958, now abandoned.

In many processes, it is desirable to pass several different fluids through a conduit cyclically and in a predetermined sequence. In such processes, it is necessary to maintain a supply conduit and a valve for each of the fluids employed. When several processing zones which require these various fluids are concurrently or alternately operated, it is necessary to have complex manifolds for supply and removal of fluids and elaborate timing and programming systems to maintain the cycles as well as a valve and supply conduit for each stream to each processing zone.

A specific example of such a process is a selective adsorption process wherein one hydrocarbon type is separated from a stream containing more than one hydrocarbon type by use of a selective adsorbent. Specifically, selective adsorbents such as those known as molecular sieves, which are aluminum silicates, may be used to selectively remove normal hydrocarbons from iso- or branched-chain hydrocarbons. The operation may be readily effected by simply passing a mixture of iso and normal hydrocarbons over the adsorbent whereby the normal hydrocarbon is adsorbed by the sieves and an effluent stream of substantially pure iso hydrocarbons is recovered. When it is desired to make a continuous process utilizing this selective quality, it is necessary, in order to reuse the sieves and to recover the normal product, to desorb the normal hydrocarbon from the sieves. This can be accomplished by subjecting the normal hydrocarbon-saturated sieves to the influence of a preponderantly greater quantity of desorbent which is preferably a material capable of displacing the normal hydrocarbon from the sieves and which is readily removable from the normal hydrocarbon by fractional distillation.

A continuous process for separating iso from normal paraffins may be effected by employing a moving bed of adsorbent which passes downwardly as a column from an adsorption zone wherein it countercurrently contacts a rising stream of mixed iso and normal hydrocarbon, thereby adsorbing the normal, to a desorption zone immediately below the feed point wherein the bed is contacted with a desorbent. A suitable column may have an intermediate feed point for the iso-normal mixture and a lower feed point for desorbent operated in conjunction with an upper take-off point for a mixture of iso-hydrocarbons and desorbent and a take-off point immediately below the feed point for removing a mixture of normal hydrocarbons and desorbent. Of course, the molecular sieves discharged from the bottom of the column must be elevated to the top and begin their descent again to produce the effect of a continuously moving column passing cyclically through all zones. Although this system is very desirable because it yields a continuous product and it may be operated as a continuous process, it is very difficult to realize in practice because the molecular sieves are physically fragile and soon destroyed by the strains involved in a moving bed process.

It has been found that a process yielding a continuous product can be obtained by maintaining the molecular sieves as a series of small fixed beds and in effect, moving the feed and take-off points past the bed instead of vice versa. For example, if a column of molecular sieves is divided into a series of small beds or zones and each bed is fitted with a feed conduit for iso-normal paraffin mixture and another for desorbent as well as take-off conduits for isoparaffin and normal paraffin, by systematically varying the material passing into and out of each bed through a regular sequence, the same effect can be achieved as when a moving bed is employed but without the physical strain on the sieves. The greater the number of small beds used, the closer to continuity the process becomes and it has been found that from about 10 to about 30 small beds produce a result indistinguishable from a continuous process with regard to product composition.

If this process is carried out using the above-described apparatus, that is, a series of beds each having four conduits connected thereto, an automatic gate valve must be placed in each conduit so that the conduits may function in sequence at the appropriate time. In addition, there must be an elaborate sequential control system comprising a timer, relay, interlock switches, etc. for programming the valves to open and close in the proper sequence and at the proper time so that only one material will be directed to or conducted from any bed at any time and all switching of fluid streams will be accomplished at the right instant to avoid reversal of flow or mixing of streams. Consequently, in a 24-bed adsorption process of the class described, it would be necessary to provide 96 automatic gate valves, 96 conduits, and a complex electrical control system. It is immediately apparent, therefore, that the inherent advantages of this operating technique, which, in a broad sense, can be employed to realize the benefits of a moving bed process using any fixed bed contactor, would be largely defeated by the practical disadvantages involved in first cost, maintenance, and unreliability of such a complex assemblage of apparatus. However, by employing a specific embodiment of the distributing valve of this invention, it is possible to eliminate all 96 gate valves by incorporating their function in a single mechanical valve, to reduce the number of conduits required from 96 to 24, and to greatly simplify the requisite control system.

It is an object of this invention to provide a unitary mechanical valve which will permit the interconnection of two independent sets of conduits such that each conduit of the first set comes into individual communication with every conduit of the second set according to a predetermined sequence upon traversal of all adjusted positions of the valve.

In one embodiment, this invention relates to a valve comprising a cylindrical valve casing having a plurality of ports extending through the casing, a rotatable plug within said casing with the exterior surface of the plug being in fluid-tight contact with the interior surface of the casing, a plurality of spaced circular grooves formed in one of said exterior and interior surfaces wholly within the area of fluid-tight contact between the plug and the casing and extending 360° around the axis of rotation of said plug, a conduit communicating with each of said circular grooves and extending through a wall of the casing to the exterior of the casing, a plurality of openings or recesses corresponding in number with said circular grooves disposed in and circumferentially spaced around the exterior surface of the plug contacting the casing, said ports in the casing being spaced around the periphery thereof so that each of the ports is in communication with each of said recesses at some point in the rotation of the plug and each of said recesses is in communication with only one port for any adjusted position of the plug, and a plurality of passageways corresponding in number with said circular grooves extending through the plug, each passageway continuously connecting one of said recesses in the plug with one of said circular grooves whereby each recess is in continuous communication with a corresponding circular groove for all positions of said plug.

In another embodiment, this invention relates to a valve comprising a cylindrical valve casing having a plurality of ports extending through the casing, a rotatable plug within said casing with the exterior surface of the plug being in fluid-tight contact with the interior surface of the casing, a plurality of spaced circular grooves formed in one of said exterior and interior surfaces wholly within the area of fluid-tight contact between the plug and the casing and extending 360° around the axis of rotation of said plug, a conduit communicating with each of said circular grooves and extending through a wall of the casing to the exterior of the casing, a plurality of longitudinal grooves corresponding in number with said circular grooves disposed in and spaced around the exterior surface of the plug contacting the casing, said ports in the casing being spaced along said axis of rotation so that each of the ports is in communication with each of said longitudinal grooves at some point in the rotation of the plug and said ports being spaced around the periphery of said casing so that each longitudinal groove is in communication with only one port for any adjusted position of the plug, and a plurality of passageways corresponding in number with said circular grooves extending through the plug, each passageway continuously connecting one of said longitudinal grooves in the plug with one of said circular grooves whereby each longitudinal groove is in continuous communication with a corresponding circular groove for all positions of said plug.

The valve of this invention may be best described with reference to the accompanying drawings which illustrate in FIGURE 1 a sectional isometric view of one valve body which may be used, in FIGURE 2 a development of the body of FIGURE 1, in FIGURES 3 and 4 a partial sectional elevation and sectional plan view of the plug which is employed with the body of FIGURES 1 and 2, in FIGURES 5 and 6 a body and plug representing a different embodiment of the invention, in FIGURES 7 and 8 a body and plug representing still another embodiment of the invention, and in FIGURE 9 a schematic diagram of a process employing the valve of this invention.

Figure 2:
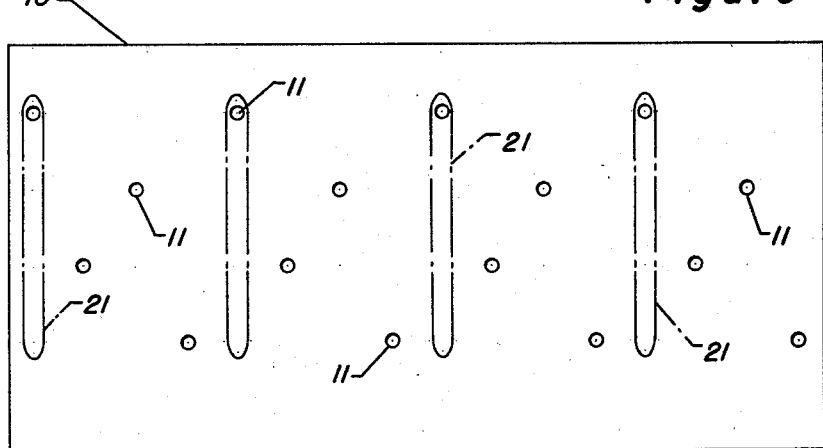
Figure 2:
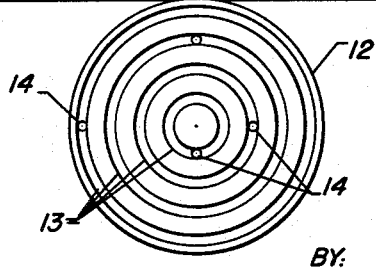

Referring to FIGURE 1, there is illustrated an outer cylindrical casing 10 and a circular lower end closure 12 with said casing containing ports 11 extending through the wall thereof. The term "cylindrical casing" as used herein and in the appended claims is intended to denote a stationary member whose exterior may be of any desired shape, e.g., tubular, square, polygonal, etc. and whose interior is hollow and of circular cross-section, adapted to receive a rotatable plug; the hollow interior may be perfectly cylindrical but preferably has a slight conical taper to provide a better seal with the matching plug. In the lower portion of the casing are a series of concentric circular grooves 13 connected through the wall thereof by means of conduits 14. The body member illustrated in FIGURE 1 is shown as a development in FIGURE 2 wherein the cylindrical portion is laid out as a rectangle 10 and the lower end closure 12 is represented as a circle. In the view of FIGURE 2 it may be seen that each groove 13 is provided with a conduit 14 extending through end closure 12 to the exterior thereof. In FIGURE 2, there is also a phantom view 21 illustrating the position of the grooves 21 in the plug member to be described in relation with FIGURE 3.

Figure 3:
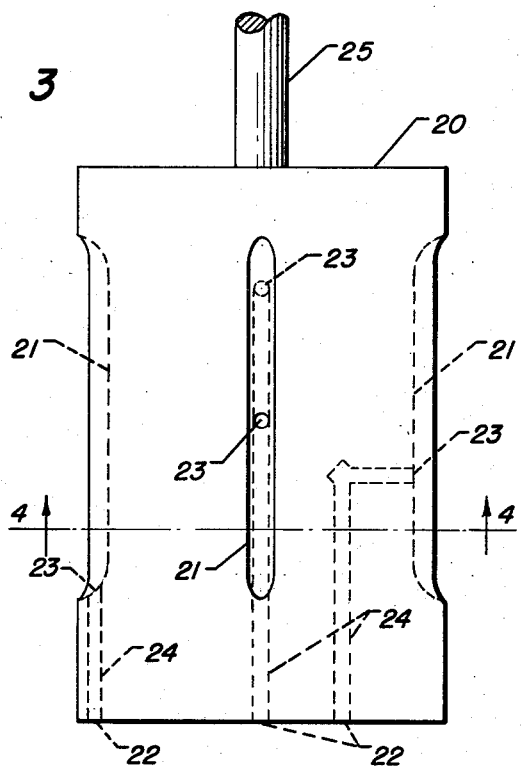
Figure 4:
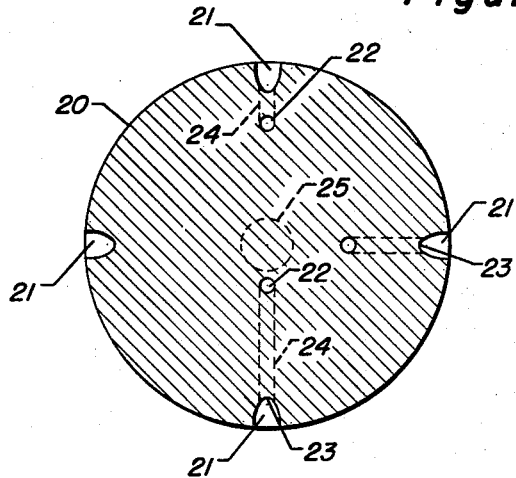

In FIGURE 3, there is illustrated a plug member consisting of a body 20 into the face of which four longitudinal grooves 21 are machined. The grooves 21 are placed vertically on the plug member so that in the course of the rotation of the plug within the body, each of ports 11 will at some time communicate with each of grooves 21. The vertical position that the grooves occupy is as shown in phantom line 21 on FIGURE 2 and the rotation of the plug in a clock-wise direction may be represented diagrammatically by the phantom outlines 21 moving from left to right on the development in FIGURE 2. It may thus be seen that the spacing of ports 11 around the internal periphery of the body member is such that each port occupies a unique position vertically in the body member when grooves 21 are vertical. It is, of course, evident that if grooves 21 were to be machined diagonally, appropriate spacings of the ports would be required so that each coincides uniquely with each groove at a specific relative position of the plug and the body.

Plug 20 also contains passageways 24 through the plug body which connect each longitudinal groove 21 to the bottom surface of the plug. In assembled condition, each of passageways 24 ends in an opening 22 that corresponds with one of circular grooves 13 of FIGURES 1 and 2, and in an opening 23 in groove 21; thus, each of longitudinal grooves 21 is in continuous fluid communication with a corresponding circular groove 13 for all positions of the plug. By maintaining a seal between valve casing and plug, grooves 13 form chambers for fluids entering or leaving the valve. Shaft 25 is rigidly connected to plug 20 to effect the rotation thereof and shaft 25 may be, and in cases of continuous processes preferably is, driven by motor means at the appropriate rate or discontinuously in appropriate cycles in order to effect the continuous regular sequential operation of the valve supplying various liquids and removing various liquids from the ports. FIGURE 4 represents a sectional plan view of plug 20 through section 4—4 of FIGURE 3 and illustrates the relative positions of openings 22 into passageways 24 and the shape and depth of grooves 21 which are suitable for this invention.

Figure 5:
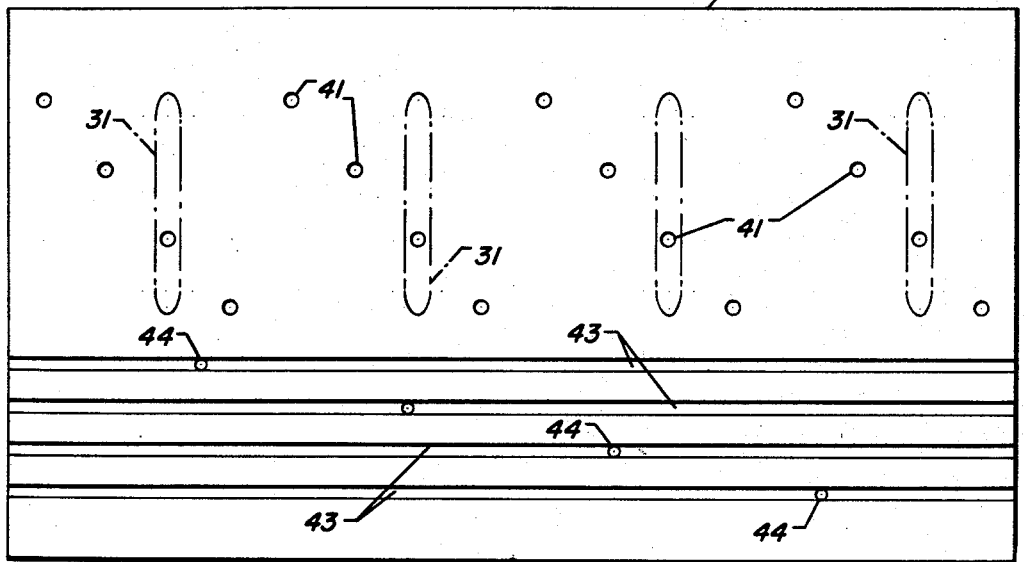
Figure 6:
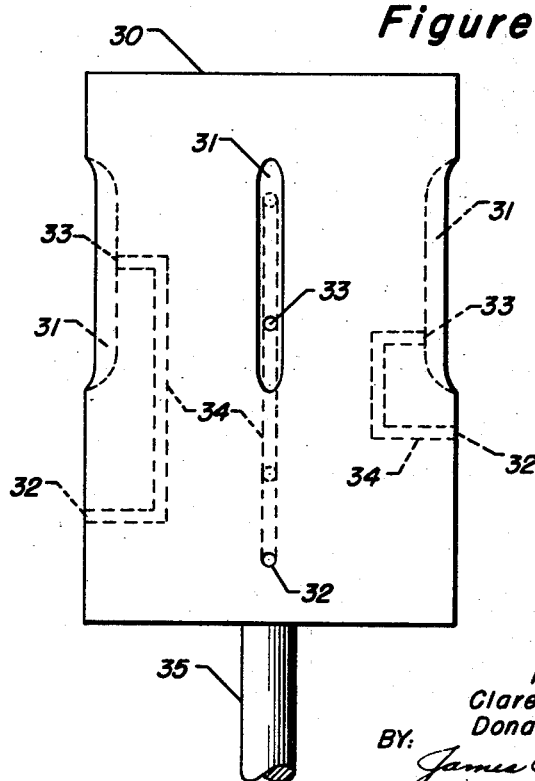

FIGURE 5 shows a development of a body member representing a different embodiment of this invention. The embodiment of FIGURE 5 illustrates spaced circular grooves 43 formed in the cylindrical wall 40 of the casing which, when bearing against the plug member, forms sealed chambers to supply fluids to and removed fluids from the grooves in the plug. Each of these chambers is provided with a conduit 44 for communicating to the outside of the valve and the upper portion of the valve body contains ports 41 which are spaced so that each at some time is in communication with each of the grooves in the plug and so that only one port is in contact with any one groove at any given time. The phantom outline 31 of the grooves of the plug are again illustrated. FIGURE 6 illustrates a plug member suitable for use in conjunction with the body illustrated in FIGURE 5. In FIGURE 6, grooves 31 are connected by passageways 34 to openings 32 in special relationship so that each opening 32 coincides continuously with only one of grooves 43. Shaft 35 is supplied to impart rotation to the plug member.

Figure 7:
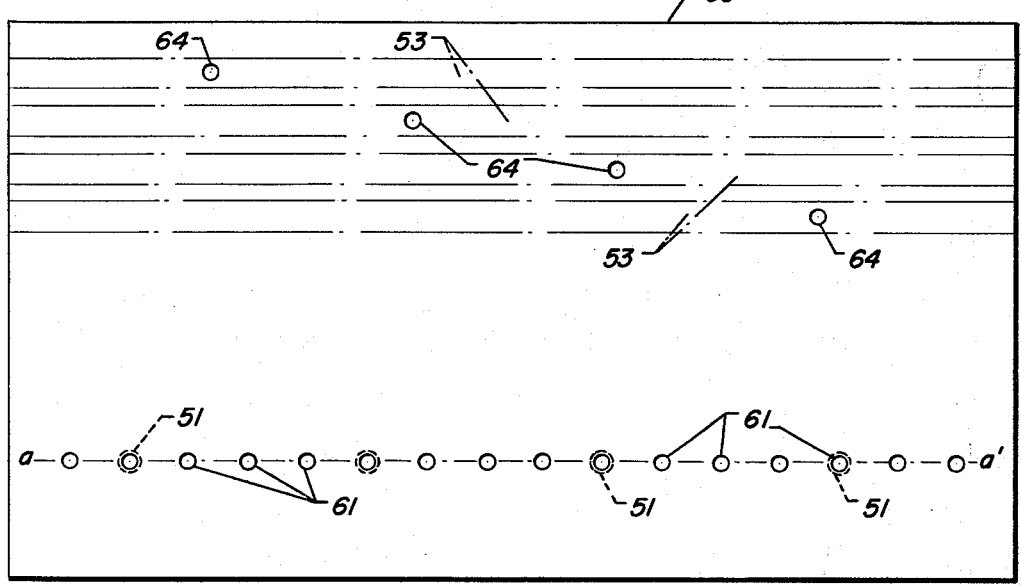
Figure 8:
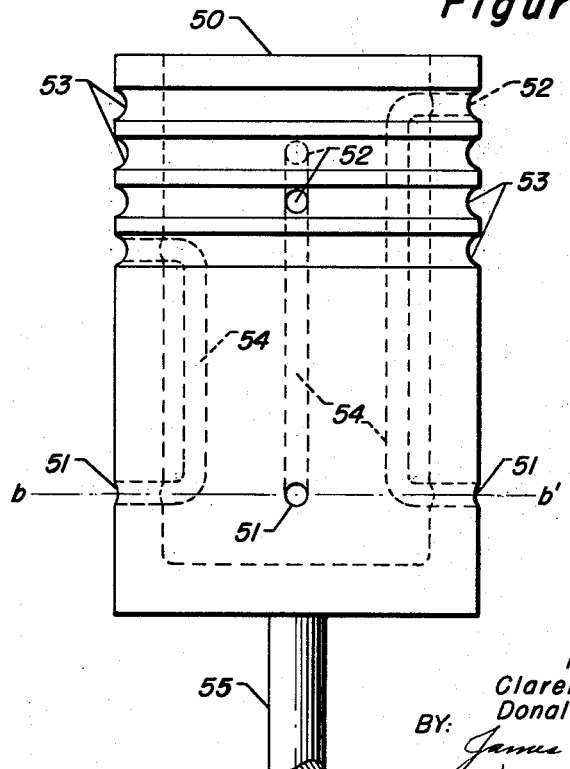

FIGURE 7 shows a development of a body member representing still another embodiment of this invention, and FIGURE 8 illustrates a plug member suitable for use in conjunction with the body of FIGURE 7. In this embodiment the circular grooves are formed in the cylindrical portion of the plug. In FIGURE 7, the circular grooves 53 appear in phantom outline against the cylindrical wall 60 of the casing. Each of the grooves 53 is provided with a conduit 64 which extends through the cylindrical wall 60 to the exterior thereof to provide fluid communication into the sealed chamber defined by a groove 53 and the inner surface of wall 60. The lower portion of the valve body contains ports 61. Unlike the embodiments previously described, ports 61 are only circumferentially spaced around the periphery of the casing, but are not staggered along the axis of rotation of the plug. All of ports 61 are transversely intersected by and substantially centered on a plane a—a' which lies perpendicular to the axis of rotation. In FIGURE 8 there is shown a hollow plug member 50 containing spaced circular grooves 53 in the upper exterior surface thereof. A plurality of recesses or openings 51, equal in number to the number of grooves 53, are circumferentially spaced around the lower periphery of plug 50. It will be appreciated that openings 51 are equivalent to the longitudinal grooves of the preceding embodiments if the latter were compressed down to approximately circular shape (openings 51 may, of course, have any desired geometric shape such as triangular, square, rectangular, trapezoidal or other polygonal configuration, elliptical, etc.). All of openings 51 are transversely intersected by and substantially centered on a single plane b—b' lying perpendicular to the axis of rotation, and, when plug 50 is properly inserted into body 60, this plane coincides with plane a—a' of FIGURE 7. Openings 51 appear in phantom outline in FIGURE 7 and register with every fourth port 61. Each of openings 51 is connected to a respective one of grooves 53 by a U-shaped pipe section 54, which extends through the hollow interior of plug 50, generally parallel to the axis of rotation, and terminates in an opening 52 within the groove 53. The hollow plug construction is advantageous because it permits a significant reduction in overall valve weight, while pipe sections 54 provide internal reinforcement and increase the rigidity of plug 50. A shaft 55 imparts rotation to the plug. The operational relationship between conduits 64, grooves 53, openings 51 and ports 61 is the same as in the other embodiments of the invention. Ports 61 are spaced so that each of the ports comes into communication with each of openings 51 at some point in the rotation of plug 50, and each opening 51 registers with only one port 61 for any adjusted position of plug 50. Continuous fluid communication is provided for each of conduits 64 via the path 64—groove 53—pipe 54—opening 51.

Figure 9:
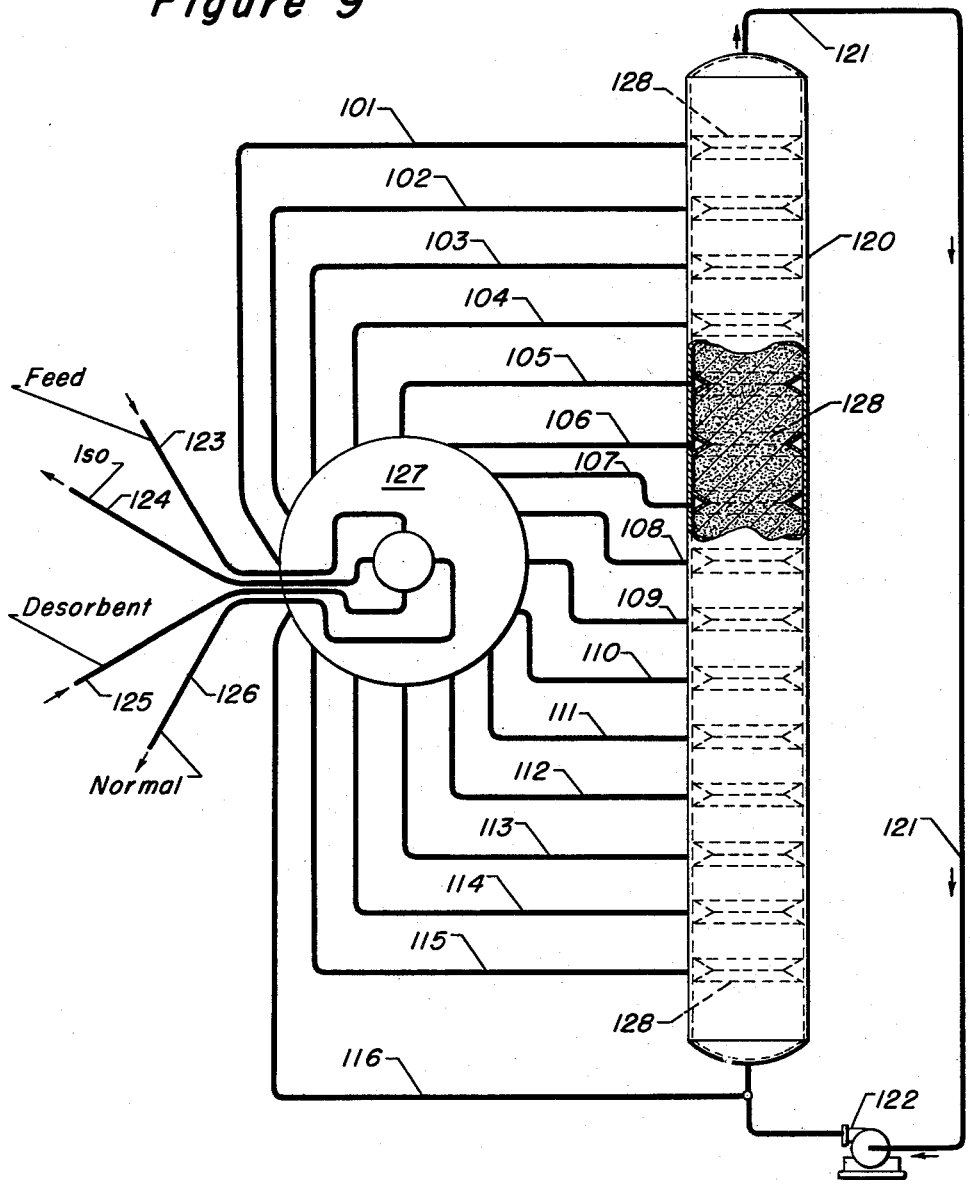

FIGURE 9 is presented to illustrate the novelty and utility of the valve of this invention and particularly to illustrate how this single simple valve member may be employed to entirely eliminate the need for manifolds, multiple valves, timers, programming devices, etc. It is emphasized that there is no intention of limiting the use of this invention to a selective adsorption process, however, for purposes of illustration, the invention will be described with regard to a process for separating a mixture of isobutane and normal butane. Instead of a moving bed process, as heretofore described, a vertical cylindrical chamber 120 is filled with a continuous column of molecular sieves of the aluminum silicate variety which will selectively retain normal butane when a mixture of normal butane and isobutane is passed through the bed. Line 121 and pump 122 connect the top of the column to the bottom and effect a continuous circulating flow through the column. The column is broken into a number individual contacting zones or beds by screens 128 which permit the removal of fluid from between the beds. One single conduit is supplied to each of the screens and these conduits are conduits 101 through 116, respectively, each of which connect to one of ports 11 or 41 or 61 of the valves illustrated in FIGURES 1, 2, 5 and 7. Conduits 123 through 126 are connected one each to circular grooves 13 or 43 or 53 in FIGURES 1, 2, 5 and 7 and they are so connected that in the rotation of the valve, a conduit that is supplied with feed will next be connected with a groove for removing isobutane, after which it will be connected with a groove which supplies desorbent, after which it will be connected with a groove for removing normal butane.

The operation may proceed as follows, assuming steady state conditions exist and the operation has been in progress, each of conduits 101 through 116 will at some time in the cycle be connected with each of conduits 123 through 126 through valve 127. At some time, feed will be introduced through line 108 and will pass upwardly through column 120. The feed passing through the beds between line 108 and 104 will have the normal butane contained therein selectively retained in the molecule sieves in the beforementioned beds. Conduits 105, 106 and 107 at this time are connected to ports that are not communicating with an opening or longitudinal groove in the valve plug. Therefore, line 104 will be connected through valve 127 to line 124 and isobutane will be removed mixed with desorbent but containing substantially no normal butane. At the same time, desorbent will be introduced into line 116 and it will pass upwardly through the column sweeping normal butane out of the beds between lines 116 and 112; line 112 will be connected through valve 127 to line 126 removing a mixture of normal butane and desorbent from the system. The system will always contain an excess of desorbent which will continuously circulate through column 120, line 121 and pump 122. As valve 127 turns, all four openings or longitudinal grooves in the plug member will move simultaneously so that they will coincide at exactly the same moment with four different ports in the valve body, and when this occurs, feed will be entering line 107 instead of 108, isobutane will be removed from line 103 instead of 104, desorbent will be introduced through line 115 instead of line 116 and normal butane will be removed through line 111 instead of 112. Therefore, the adsorbing zone will have changed its character by removing one bed from the bottom and adding one bed to the top of it as will all of the other zones in the process. In the course of one complete revolution of the valve, each port in the body will pass all streams to and from the process and each bed in the column will be used in every capacity. Each revolution of the valve causes a complete adsorption-desorption cycle of the process.

It may readily be seen that by increasing the number of beds involved, each change of position of the valve will represent a lesser degree of change and the process will more closely approximate complete continuity. It may also be seen that by increasing the number of beds, when an ordinary manifold and valving system is employed, the costs and complexity of the system are materially increased; however, by employing the valve of this invention, the use of additional ports, additional openings or longitudinal grooves and additional supplying chambers represents a very small increase in the complexity and cost of the equipment and represents absolutely no problem in maintaining the program and the relationship of each stream to each other. It may readily be seen further from the foregoing description that the complicated programming and complex flow of four different streams to and from each bed at various intervals of the course of the process is readily and unerringly effected without manifolds, without multiple valves or programming devices by the simple, single mechanical unitary device of this invention.

Although the valve of this invention has been described in relation to the process for separating isoparaffin from normal paraffin, employing molecular sieves, it is applicable to many other processes and even to many modifications of the process described. For example, the valve of this invention is useful in processes such as catalytic cracking, catalytic reforming, etc. wherein a catalyst is employed which requires regeneration after a processing period and, therefore, must be contacted with at least the reacting fluids and the regenerating fluids and frequently purging or inert sweeping fluids to prevent mixing of various streams.

Although the instant distributing valve has been described in relation to an adsorption process wherein sixteen separate beds of adsorbent are employed, it is, of course, obvious that more or less beds may be employed and when more beds are employed, the alteration of the valve is only to the extent that a greater number of ports in the body member must be provided. It is also within the scope of this invention to provide a valve which supplies or removes from a process a greater number or a lesser number of streams than those shown. For example, the plug member of the valve may contain any number of recesses, whether in the form of simple openings or as longitudinal grooves each of which supplies to or removes from the process a unique fluid.

It should be noted that the plug and body members shown in the drawings are simplified and uncomplicated embodiments of the invention and it is intended that the broad scope of this invention include tapered plugs and valves that employ packing or a solid autolubricant, such as a fluorohydrocarbon, rather than metal-to-metal sealing surfaces; the use of packing instead of metal-to-metal seals is especially useful in larger valves. The spaced circular grooves may be sealed one from another by use of single or double O-ring seals and/or use of intermediate leakage grooves or tracks, which conduct leakage fluid away to a zone of reduced pressure, whereby to minimize product contamination by cross-groove leakage.

It is also within the scope of this invention to employ manual or mechanical driving means to the plug and the driving means may include electric, hydraulic, pneumatic or other driving means which cause the plug to rotate at a steady rate or which cause it to move in rapid discontinuous motions at proper intervals.

This invention further contemplates the disposition of ports around the inside of the body member so that a complete seal is never obtained; that is, so that fluid begins flowing into one port before the previous port is completely sealed, thereby preventing liquid hammers in the system.

The plug members illustrated all have four regularly spaced openings or longitudinal grooves on their faces; however, this invention includes the use of more openings or grooves and they may be spaced irregularly to provide any program required by the process, for example, if it is desired to have a 6-bed adsorbing zone and a 2-bed desorbing zone, spacing the appropriate openings or grooves six ports apart and two ports apart will automatically result in this program.

While the foregoing embodiments have shown the circular grooves to be formed on the inner side of the valve casing or on the cylindrical portion of the plug, further variations include locating the circular grooves on one end of the plug, in which case the body will require an adjacent end wall, or on both ends of the plug, or on one end and also the cylindrical portion of the plug, or partly on the inner side of the casing and partly on the surface of the plug.

When the circular grooves are formed on the inner side of the cylindrical wall of the valve casing, or on the exterior cylindrical surface of the plug, it is not necessary that a tight seal be formed between the bottom of the plug and the circular end closure member 12 since no fluid is then passed between these two surfaces; in this case, it may be entirely feasible to omit the end closure member altogether.

The embodiments of FIGURES 1 to 6, which utilize longitudinal grooves in the plug and body ports which are spaced both peripherally and also along the axis of revolution, have the advantage that a large number of ports may be used for a given casing diameter. Where casing diameter is not limiting in a particular application, the embodiment of FIGURES 7 and 8, which utilizes circumferentially spaced openings in the plug and body ports which are not staggered along the axis of revolution, may prove more suitable because the thickness of the valve (measured parallel to the axis of revolution) is minimized.

We claim as our invention:

1. A valve comprising a cylindrical valve casing having a plurality of ports extending through the casing, a cylindrical rod shaped plug having two ends within said casing and rotatable therein, the exterior surface of the plug being in fluid-tight contact with the interior surface of the casing, a plurality of spaced circular grooves formed in one of said exterior and interior surfaces wholly within the area of fluid-tight contact between the plug and the casing and extending 360° around the axis of rotation of said plug, all of said parallel circular grooves disposed between one of said ends of the plug and the ports, a conduit communicating with each of said circular grooves and extending through a wall of the casing to the exterior of the casing, a plurality of recesses corresponding in number with said circular grooves disposed in and circumferentially spaced around the exterior surface of the plug contacting the casing, said ports in the casing being spaced around the periphery thereof so that each of the ports is in communication with each of said recesses at some point in the rotation of the plug and each of said recesses is in communication with only one port for any adjusted position of the plug, and a plurality of passageways corresponding in number with said circular grooves extending through the plug, each passageway continuously connecting one of said recesses in the plug with one of said circular grooves whereby each recess is in continuous communication with a corresponding circular groove for all positions of said plug.

2. A valve comprising a cylindrical valve casing having a plurality of ports extending through the casing, a cylindrical rod shaped plug having two ends within said casing and rotatable therein, the exterior surface of the plug being in fluid-tight contact with the interior surface of the casing, a plurality of spaced circular grooves formed in one of said exterior and interior surfaces wholly within the area of fluid-tight contact between the plug and the casing and extending 360° around the axis of rotation of said plug, all of said parallel circular grooves disposed between one of said ends of the plug and the ports, a conduit communicating with each of said circular grooves and extending through a wall of the casing to the exterior of the casing, a plurality of longitudinal grooves corresponding in number with said circular grooves disposed in and spaced around the exterior surface of the plug contacting the casing, said ports in the casing being spaced along said axis of rotation so that each of the ports is in communication with each of said longitudinal grooves at some point in the rotation of the plug and said ports being spaced around the periphery of said casing so that each longitudinal groove is in communication with only one port for any adjusted position of the plug, and a plurality of passageways corresponding in number with said circular grooves extending through the plug, each passageway continuously connecting one of said longitudinal grooves in the plug with one of said circular grooves whereby each longitudinal groove is in continuous communication with a corresponding circular groove for all positions of said plug.

3. A valve comprising a cylindrical valve casing having a plurality of ports extending through the casing, a cylindrical rod shaped plug having two ends within said casing and rotatable therein and in fluid-tight contact therewith, a plurality of spaced circular grooves formed within and extending 360° around the inner side of said casing wholly within the area of fluid-tight contact between the plug and the casing, all of said parallel circular grooves disposed between one of said ends of the plug and the ports, a conduit extending from each of said circular grooves through a wall of the casing to the exterior of the casing, a plurality of longitudinal grooves corresponding in number with said circular grooves disposed in and spaced around the face of the plug contacting the casing, said ports in the casing being spaced along the axis of rotation of the plug so that each of the ports is in communication with each of said longitudinal grooves at some point in the rotation of the plug and said ports being spaced around the periphery of said casing so that each longitudinal groove is in communication with only one port for any adjusted position of the plug, and a plurality of passageways corresponding in number with said circular grooves extending through the plug, each passageway continuously connecting one of said longitudinal grooves in the plug with one of said circular grooves on the inner side of said casing whereby each longitudinal groove is in continuous communication with a corresponding circular groove for all positions of said plug.

4. The valve of claim 3 further characterized in that each of said longitudinal grooves simultaneously communicates with two adjacent ports during a portion of the plug rotation from each adjusted position thereof to the next adjusted position.

5. A valve comprising a valve casing having a cylindrical wall and a circular end closure, a plurality of ports extending through said cylindrical wall from the interior to the exterior of the casing, a plurality of concentric circular grooves within and extending 360° around the inner side of said closure, a conduit extending from each of said circular grooves through said closure to the exterior of the valve casing, a rotatable plug within said casing and in fluid-tight contact with said cylindrical wall and end closure, a plurality of longitudinal grooves corresponding in number with said circular grooves disposed in and spaced around the face of the plug contacting said wall, said ports in said wall being spaced along the axis of rotation of the plug so that each of the ports is in communication with each of the longitudinal grooves at some point in the rotation of the plug and said ports being spaced around said cylindrical wall so that each longitudinal groove is in communication with only one port for any adjusted position of the plug, and a plurality of passageways corresponding in number with said circular grooves extending through the plug, each passageway continuously connecting one of said longitudinal grooves in the plug with one of said circular grooves in said end closure whereby each longitudinal groove is in continuous communication with a corresponding circular groove for all positions of said plug.

6. A valve comprising a cylindrical valve casing having a plurality of ports extending through the cylindrical wall of the casing from the interior to the exterior of the casing, a cylindrical rod shaped plug having two ends within said casing and rotatable therein and in fluid-tight contact with said cylindrical wall, a plurality of spaced circular grooves formed within and extending 360° around the inner side of said cylindrical wall wholly within the area of fluid-tight contact between the plug and the casing, all of said parallel circular grooves disposed between one of said ends of the plug and the ports, a conduit extending from each of said grooves through said wall to the exterior of the valve casing, a plurality of longitudinal grooves corresponding in number with said circular grooves disposed in and spaced around the face of the plug contacting said wall, said ports in said wall being spaced along the axis of rotation of the plug so that each of the ports is in communication with each of the longitudinal grooves at some point in the rotation of the plug and said ports being spaced around said cylindrical wall so that each longitudinal groove is in communication with only one port for any adjusted position of the plug, and a plurality of passageways corresponding in number with said circular grooves extending through the plug, each passageway continuously connecting one of said longitudinal grooves in the plug with one of said circular grooves in said wall whereby each longitudinal groove is in continuous communication with a corresponding circular groove for all positions of said plug.

7. A valve comprising a cylindrical valve casing having a plurality of ports extending through the casing, a cylindrical rod shaped plug having two ends within said casing and rotatable therein and in fluid-tight contact therewith, a plurality of spaced circular grooves formed in the exterior surface of said plug wholly within the area of fluid-tight contact between the plug and the casing and extending 360° around the axis of rotation of said plug, all of said parallel circular grooves disposed between one of said ends of the plug and the ports, a conduit communicating with each of said circular grooves and extending through a wall of the casing to the exterior of the casing, a plurality of recesses corresponding in number with said circular grooves disposed in and circumferentially spaced around the face of the plug contacting the casing, said ports in the casing being spaced around the periphery thereof so that each of the ports is in communication with each of said recesses at some point in the rotation of the plug and each of said recesses is in communication with only one port for any adjusted position of the plug, and a plurality of passageways corresponding in number with said circular grooves extending through the plug, each passageway continuously connecting one of said recesses in the plug with one of said circular grooves therein whereby each recess is in continuous communication with a corresponding circular groove for all positions of said plug.

8. A valve comprising a cylindrical valve casing having a plurality of ports extending through the cylindrical wall of the casing from the interior to the exterior of the casing, a cylindrical rod shaped plug having two ends within said casing and rotatable therein and in fluid-tight contact with said cylindrical wall, a plurality of spaced circular grooves formed within and extending 360° around the exterior surface of said plug wholly within the area of fluid-tight contact between the plug and said cylindrical wall, all of said parallel circular grooves disposed between one of said ends of the plug and the ports, a conduit communicating with each of said circular grooves and extending through said wall to the exterior of the valve casing, a plurality of openings corresponding in number with said circular grooves disposed in and circumferentially spaced around the face of the plug contacting the casing, all of said openings and all of said ports being intersected by a plane perpendicular to the axis of rotation of said plug, said ports in said wall being spaced around the periphery thereof so that each of the ports is in communication with each of said openings at some point in the rotation of the plug and each of said openings is in communication with only one port for any adjusted position of the plug, and a plurality of passageways corresponding in number with said circular grooves extending through the plug, each passageway continuously connecting one of said openings in the plug with one of said circular grooves therein whereby each opening is in continuous communication with a corresponding circular groove for all positions of said plug.

9. The valve of claim 8 further characterized in that the rotatable plug is hollow and said passageways are formed by pipe sections each extending from a circular groove through the hollow interior of said plug to one of said openings.

References Cited by the Examiner
UNITED STATES PATENTS

| | | | |
|---|---|---|---|
| 1,024,909 | 4/12 | Powelsen | 251—183 X |
| 1,447,008 | 2/23 | Barnebl | 137—625.11 |

M. CARY NELSON, *Primary Examiner.*

MARTIN P. SCHWADRON, *Examiner.*